Dec. 7, 1965  A. NOVICK  3,221,584
MACHINE FOR CUTTING PORTIONS FROM BLANKS OF SHEET MATERIAL
Filed Sept. 26, 1963  5 Sheets-Sheet 5
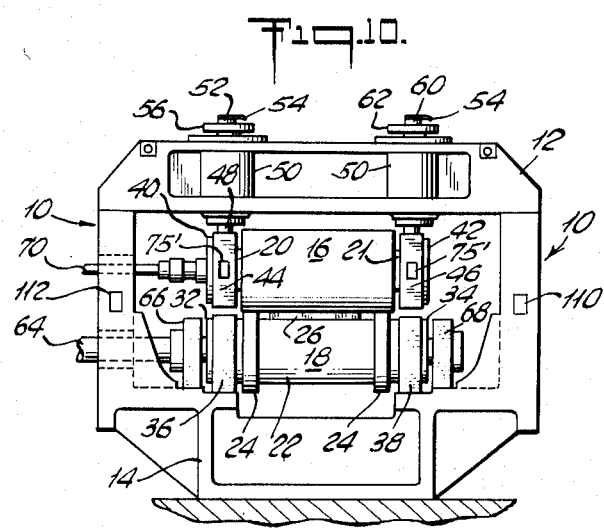
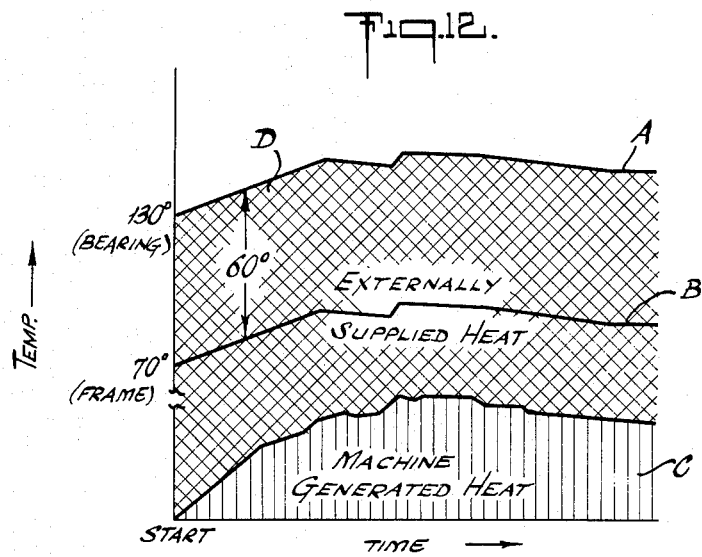
INVENTOR.
ABRAHAM NOVICK
BY
Nolte & Nolte
ATTORNEYS United States Patent Office 3,221,584
Patented Dec. 7, 1965

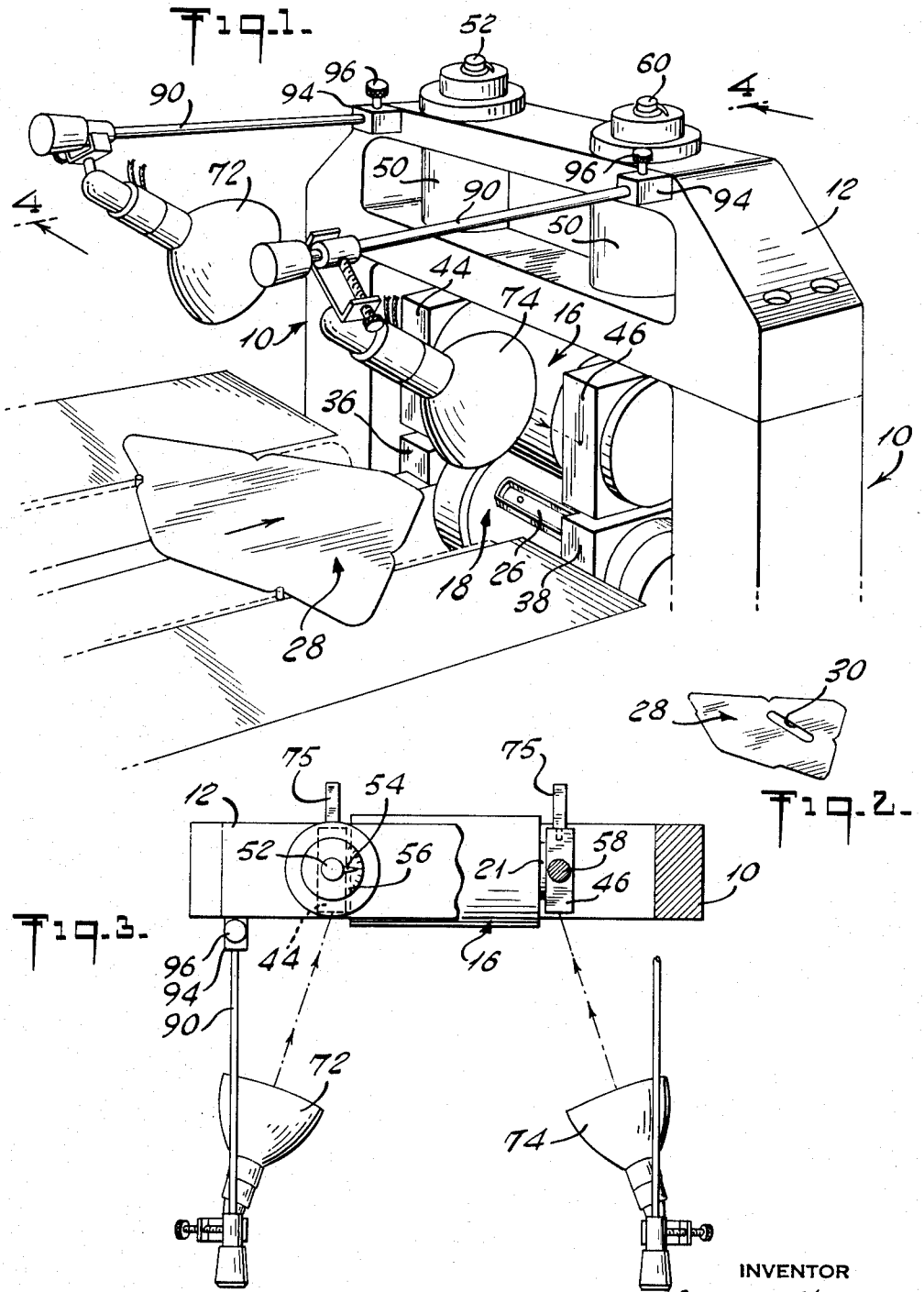

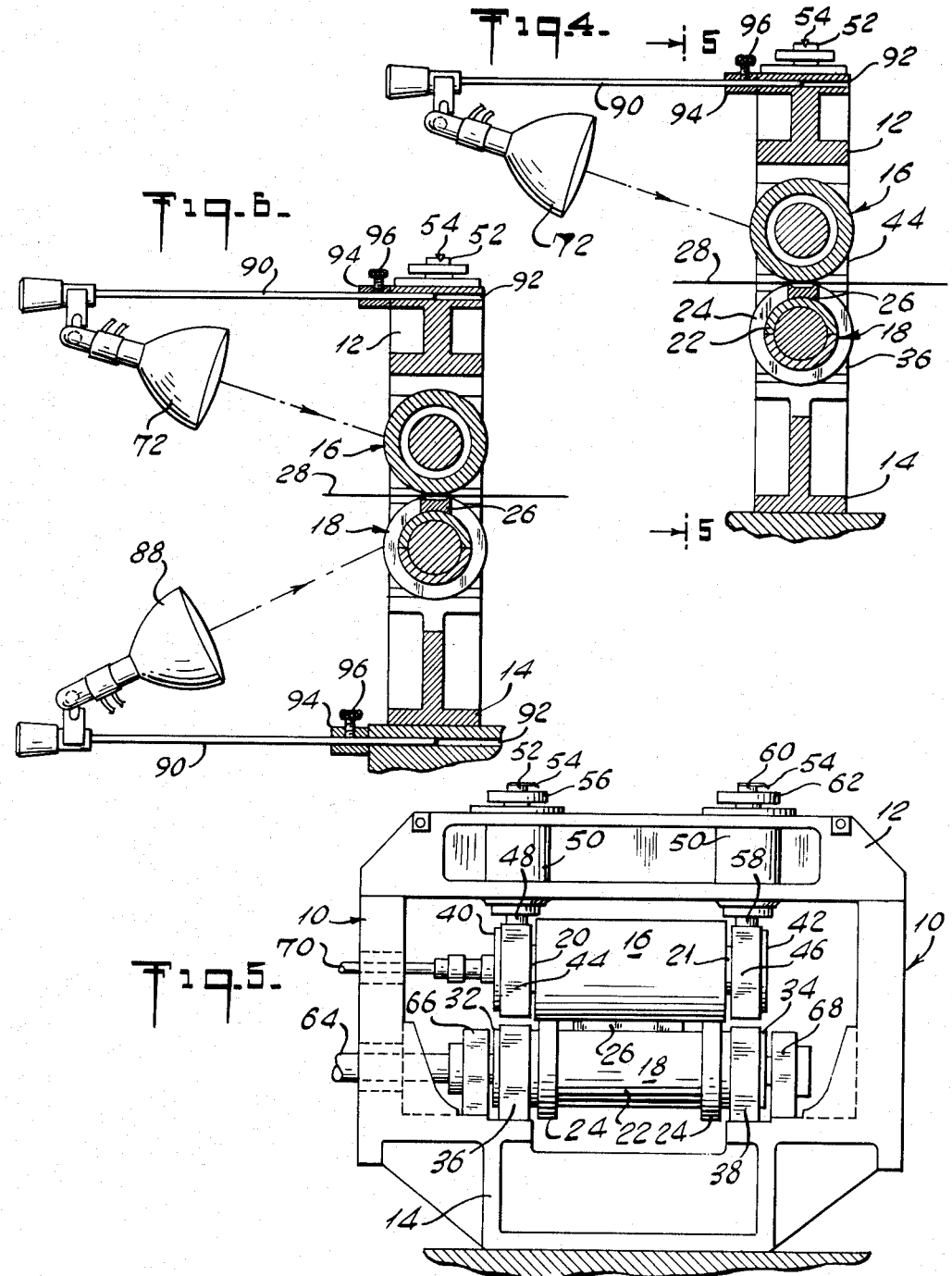

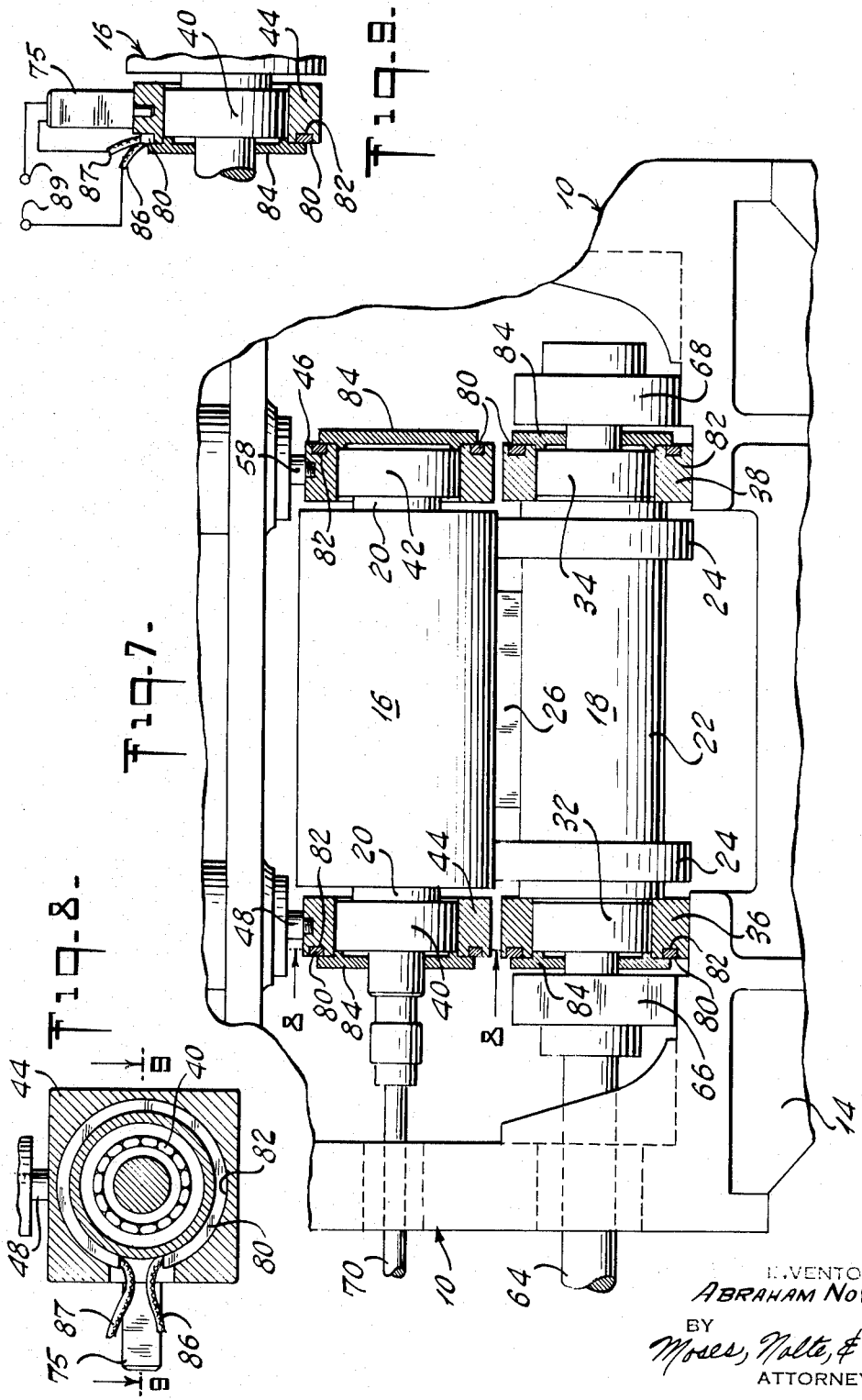

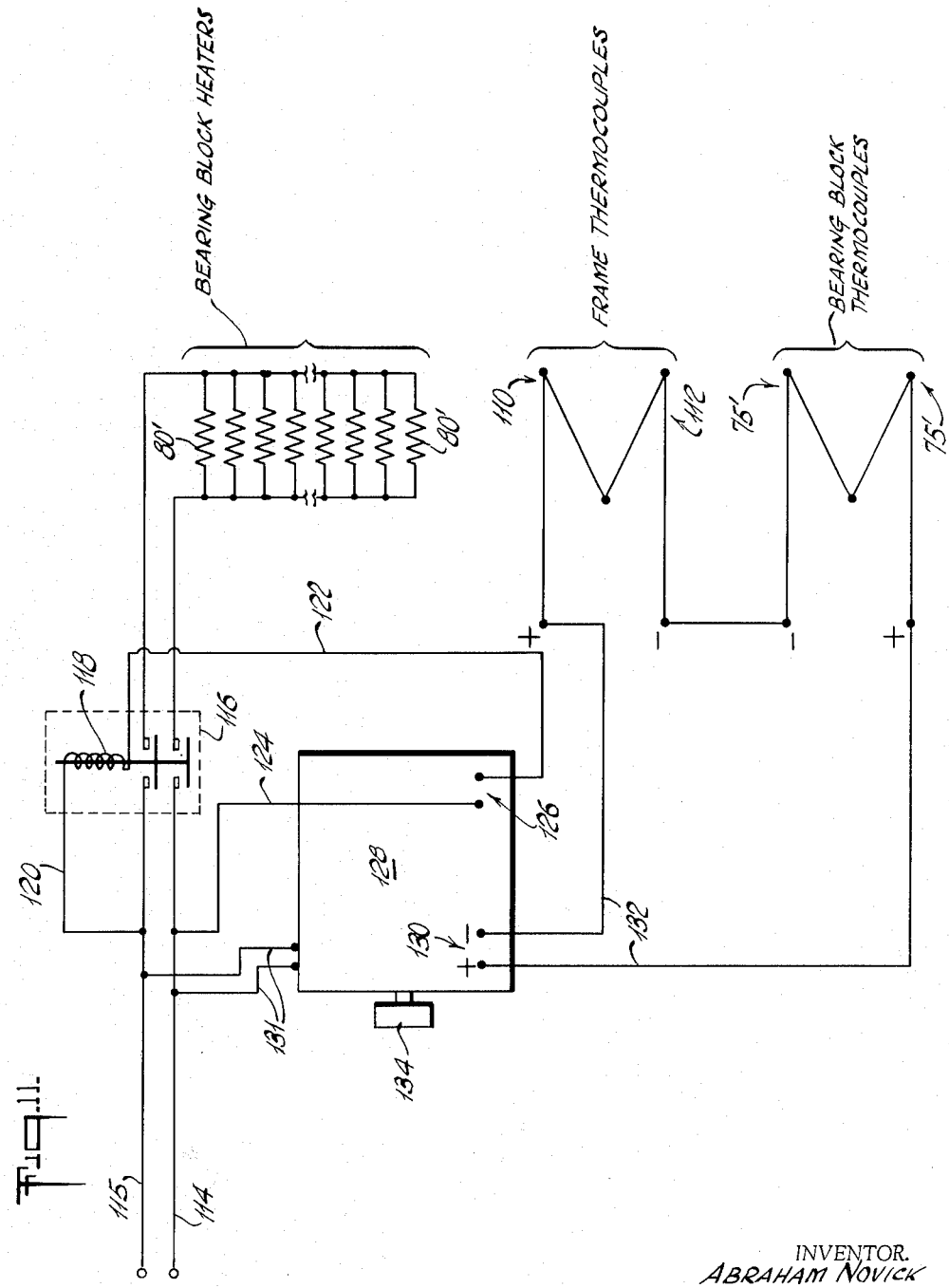

3,221,584
MACHINE FOR CUTTING PORTIONS FROM BLANKS OF SHEET MATERIAL
Abraham Novick, Flushing, N.Y., assignor to F. L. Smithe Machine Co., Inc., New York, N.Y., a corporation of New York
Filed Sept. 26, 1963, Ser. No. 312,834
6 Claims. (Cl. 83—170)

This invention relates to machines and a method for cutting panels from blanks of sheet material, and more particularly to apparatus for cutting edge notches or window panels from blanks for articles such as mailing envelopes and the like.

This application is a continuation-in-part of my pending application, Serial No. 129,270, filed August 4, 1961, now abandoned.

In the types of machines to which this invention relates, there are commonly provided a pair of cooperating rollers between which each blank is fed to remove the desired portions therefrom. For this purpose one of the rollers is provided with a cutting die corresponding to the shape of the window or other portion to be removed from the blank. In the method of cutting to which the present invention is directed, a clearance less than the thickness of the paper stock is always provided between the rollers so that the cutting die cuts almost, but not completely, through the blank. Complete severance of the waste section therefrom is effected due to the failure, in compression, of the remaining thickness of the blank. Accordingly, a very accurate control of the clearance between the cutting edge of the die and its cooperative anvil roller is necessary to insure proper severance of the waste section. If the clearance exceeds the optimum dimension incomplete severance of the waste portion results. On the other hand, if the cutter to anvil roller clearance becomes smaller than desired, the cutting edge pressures are increased which results in premature dulling of the cutter. Should the clearance decrease to such a point that physical contact occurs between the rotating cutter and its cooperative anvil immediate dulling results. From the foregoing it may be readily appreciated how optimum performance of rotary cutters operating under these principles require a very accurate physical setting with respect to their cooperative anvil rollers which setting must be maintained throughout a wide temperature range.

A machine of this general character is disclosed in copending application Serial No. 814,205, filed May 19, 1959, now Patent No. 3,106,121, and some of the construction herein described corresponds to features therein contained.

In the operation of such a device, careful attention must be paid to the clearance which is apt to vary frequently and progressively. The most usual cause of variation is heat developed in the process of cutting. This is apt to have an accumulative effect which sometimes causes jamming of the rollers with respect to each other.

Accordingly, it is an object of this invention to avoid the harmful effect of temperature developed in the machine of this character.

It is a further object of this invention to provide a method of operating a machine of this character, in which the heat developed internally from the operation of the machine will assist in maintaining proper clearance of the cutting rollers.

It is a further object of the invention to provide a novel temperature control system for rotary cutters of the type described wherein a constant differential temperature is maintained between respective portions of the machine.

Another object of the invention is to provide a novel differential temperature maintenance system for a rotary cutter of the type described wherein the temperature differential is readily adjustable to effect minute physical changes in the relationship of the cooperating cutter parts.

Other objects and advantages of the invention will be in part obvious and in part pointed out in the following description of preferred embodiments of the invention illustrated in the accompanying drawings, in which:

FIG. 1 is a perspective view of the upper portion of the machine taken from a forward position;

FIG. 2 is a portion of the blank of material showing the nature of the window cut therein;

FIG. 3 is a top view of the machine, partly cut away, to show the interior construction;

FIG. 4 is a section of the machine taken along line 4—4 of FIG. 1, looking in the direction of the arrows;

FIG. 5 is a front view of the machine taken along line 5—5 of FIG. 4, looking in the direction of the arrows;

FIG. 6 is a sectional view of a machine, similar to the view of FIG. 4, with a modified arrangement of heating elements;

FIG. 7 is a front view of another modified arrangement, the roller assembly and the roller bearing sections of parts of the frame being shown;

FIG. 8 is a section through a bearing and its mounting taken along line 8—8 of FIG. 7, looking in the direction of the arrows;

FIG. 9 is a section through bearing mounting taken longitudinally along line 9—9 of FIG. 8 and indicating the temperature probe associated therewith;

FIG. 10 is a view similar to FIG. 5 showing another embodiment of the invention including thermocouples for sensing the temperature of the machine frame;

FIG. 11 is a schematic diagram showing the differential temperature control circuit employed in the embodiment of FIGURE 10; and FIG. 12 is a graph illustrating the performance of the embodiment of FIGS. 10 and 11.

Referring to the drawing, as shown in FIG. 1, the machine is provided with a frame having a pair of spaced apart side posts 10 with a suitable head 12 bridging the gap between the posts, a suitable base 14 formed integrally with posts 10 completing the generally rectangular form of the frame.

Within the frame are mounted a pair of rollers 16 and 18, the former being cylindrical in form terminating in shaft ends 20 and 21, while the roller 18 has a central portion 22 of reduced diameter and cylindrical portions 24 between which is mounted a die 26 adapted to operate upon a suitable blank 28, of an article such as an envelope, to cut out the panel as shown at 30 (FIG. 2). The roller 18 is, at its ends, mounted in anti-friction bearings 32 and 34, the outer races of which are secured to bearing brackets 36 and 38, which may be formed integrally with the base portion 14.

Roller 16 is also provided at its ends with antifriction bearings 40 and 42 provided with bearing boxes 44 and 46, respectively, which are separately adjustable in a vertical direction to provide suitable clearance between rollers 16 and 18. For this purpose, bearing box 44 is screwed to the end of a plunger 48 carried by suitable cylinder 50 and raiseable therein by rotation of a screw 52 (FIG. 3). Bearing index 54 cooperates with a stationary dial 56 indicating the elevation of bearing box 44 and the corresponding clearance at the adjacent ends of rollers 16 and 18.

A similar plunger 58 is provided for bearing box 46, similarly manipulated by elevating screw 60 cooperating with the dial 62 (FIG. 5).

Any suitable means may be provided for driving the rollers; in this instance the main drive is provided by the shaft 64 coupled to roller 18, for the purpose of stiffness, having bearings 66 and 68 at opposite ends of roller 18. Roller 16 may be driven by friction of the blank introduced between roller 16 and roller 18, or may be provided with a laterally extending shaft 70, for individual drive or for coupling with shaft 64.

As has been said above, the clearance between roller 16 and roller 18 is quite critical. It is not desired that the cutter 26 should contact roller 16, although it comes very close to doing so for the purpose of severing the piece removed at the window 30. It has been found that with continued cutting of the envelope blanks, the heat generated by the rotating members and the thermal expansion thereof is sufficient to cause an interference between the cutter and the anvil roller and resultant destruction of the parts. By this invention, means is provided to avoid this condition which results in a new method of operating such a machine.

By the improved method the bearings are initially heated to a temperature in excess of the normal running frictionally caused temperature of the machine, this heat being applied externally of the bearings. Such initial heating provides a condition at which the suitable clearance of rollers 16 and 18 is set; then, as the machine heats up due to its operation, heat generated internally in this way is counterbalanced by reduction of the heat supplied externally so that the temperature remains substantially constant and clearance is maintained within a very close range.

The apparatus for carrying out this method consist of temperature producing means directed at the bearings, in this instance, consisting of heating units 72 and 74, preferably of the infra-red type, focusing their heat rays upon the roller bearings. As indicated in FIG. 3, heating unit 72 is directed at bearing box 44 containing anti-friction bearing 40, while heating unit 74 is directed at bearing box 46 containing anti-friction bearing 42. To counteract excessive heating which might be produced by continued exposure of the bearings to the rays from units 72 and 74, means is provided, controlled by the temperature existing internally of the bearings to reduce such externally applied heat so that the combined heating effect will remain substantially constant.

For this purpose, as indicated in FIG. 3, a thermo-coupler, probe, or sensor 75 is associated, for instance, with bearing box 44, and a suitable electrical circuit, as for instance that shown in FIGS. 8 and 9 controls the heating unit 72.

Thus, as the temperature in bearing 40 increases to any substantial degree above that permissible or which to any substantial degree would affect the running of rollers 16 and 18 with respect to each other, temperature probe will operate to cut off the current to heating element 72 until the temperature subsides to a predetermined degree. It is understood that heating unit 74 will likewise be provided with a similar control.

In FIG. 6 is shown an arrangement wherein each bearing in its bearing box is provided with a heating element. As indicated, a lower heating element 88 is directed at the lower bearing 32 to control the temperature in roller 18. Thus, the heat producing means includes a unit corresponding to each bearing and directly solely thereat. It is understood that each bearing will have a heat responsive means, in this case, a temperature probe 75 for controlling the corresponding heating units individually.

Any suitable mounting may be provided for the heating units 72, 74 and 88. In this instance, a supporting rod 90 for each such unit extends forwardly from a suitable bore 92 formed in the frame and has a nut 94 and set screw 96 by which it is maintained in position. It will, thus, be seen that the spacing of the heating units from the bearings will make the heating effect greater or less, or more or less quickly responsive by the adjustment thus provided.

In the embodiment shown in FIGS. 7, 8 and 9 the heat applied externally to the bearing is produced by elements contained in the bearing boxes. For this purpose, each bearing box 36, 38, 44 and 46 contains a heating coil 80 set into a recess 82 in the outer face of the box and held therein by a suitable cover plate 84. The external leads 86 and 87 are connected in series with the current source 89 and thermo-coupler switch probe 75.

Referring to FIGURES 10 to 12 inclusive wherein like elements have been designated with like reference numerals, a preferred and more refined form of the invention is shown. This embodiment includes means for compensating for changes in clearance between the anvil roller 16 and cutting die 26 due to changes in the temperature of the machine frame. In this embodiment a constant differential temperature is maintained between supporting structure 10 of the machine's skeleton and by cutting rollers irrespective of changes in the amount of internally generated heat within the machine or changes in temperature of the room enclosing the machine. Accordingly, once the desired operating clearance has been set between the cutter 26 and its cooperating anvil roller 16 it will be maintained irrespective of changes in the machine speed or frame temperature. Another feature of this form of the invention is that minute cutter to anvil clearance adjustments may be made by varying the preset thermal differential maintained by the control system. In this way applicant's arrangement has provided, in effect, a fine-coarse adjustment system for the anvil to cutter clearance. The coarse adjustments may be readily obtained by the angular rotation of elevating screws 52 and 60. The fine, or minute adjustments in the clearance between the same operating parts may be obtained by suitable adjustment of the differential temperature controller in a manner to be described more fully hereafter.

Specifically, referring to FIGURE 10, each of the upstanding vertical side members of the frame 10 is provided with a pair of frame thermocouples respectively designated 110 and 112. The frame thermocouples 110, 112 are connected in series so that their voltage outputs are additive. The thermocouples 110, 112 are in turn connected in series with the bearing block thermocouples designated 75' connected in similar fashion. Referring to FIGURE 11, a source of electrical power is applied to the input leads 114, 115 which are connected through the normally open contact points of a control relay 116 to a plurality of heaters 80'. It should be understood that while eight heaters have been indicated, the total number is not of importance and more or less may be provided as required at suitable locations on or adjacent the machine structure to accomplish the desired heating effect. The relay 116 includes a winding 118 connected at one end via lead 120 to the power supply lead 115. The other end of the winding 118 is connected via lead 122 to one of a pair of output terminals 126 located upon a differential temperature thermocouple controller shown generally at 128. The internal details of the controller 128 are well known and it may be of the type commercially available as Minneapolis-Honeywell Thermocouple controller model R-7161 B 1007. The other output terminal 126 is connected via lead 124 to the input lead 114. Leads 131 supply the controller with suitable operating current. The controller 128 includes a pair of thermocouple input terminals 130 which are connected through a pair of leads 132, 132 to the frame thermocouples 110 and 112 and the bearing block thermocouples 75', 75'. The frame thermocouples 110, 112 are connected in series with one another with the polarity as indicated. The bearing block thermocouples 75', 75', each also in series, are connected in series with the frame thermocouples in reverse polarity therewith. In this way, their minute voltage outputs will be in opposition and the controller may be readily preset by a control knob 134 to effect internal connection and disconnection of the output terminals 126 at any desired voltage difference (corresponding to a temperature difference) between the pairs of frame and bearing block thermocouples. In the circuit arrangement shown the series connection of each of the thermocouple pairs 110, 112 and 75', 75' provides maximum control sensitivity because their voltages are additive. However, each of the thermocouple pairs could be connected in parallel without departing from the scope of the present invention. In one successfully operated example of this form of the invention, the thermocouple controller was adjusted to maintain a constant 60 degree Fahrenheit temperature differential between the measured frame and bearing block temperatures. In this example the nominal bearing block or anvil cutter temperature is approximately 130 degrees while the frame temperature is 70 degrees.

In operation, prior to machine start-up, the bearing blocks have been pre-heated to the 130 degrees temperature, the cutter 26 to anvil roller 16 adjustment is made by rotation of the screws 52, 60. Thereafter, as the temperature of the upright members of the frame 10 either increases or decreases from their temperature at which the initial adjustment is made, a corresponding increase or decrease in temperature of the bearing blocks is effected by control of heaters 80' by applicant's invention to maintain a constant temperature differential therebetween.

In the above described mode of operation, making reference to FIG. 12, the average temperature measured by the anvil and bearing block thermocouples 75' 75' is represented by a curve A. At machine start, the lever of the curve A is indicated at 130 degrees Fahrenheit. Also at machine start, a 70 degree frame temperature measured by the thermocouples 110 and 112 is represented by the left end of the curve designated B. As the machine is operated a variable amount of internally generated heat is produced. Some of this heat is absorbed by the machine elements and is represented (with respect to time) by the shaded area designated C. Obviously, this machain generated heat C will effect a corresponding increase in the frame temperature from the original 70 degree level which if uncompensated for would elongate the side members of the frame 10 and tend to move the anvil and cutter away from each other. However, the thermocouples 110 and 112 are effective to activate the controller 118 so that the output terminals 126 are internally connected (by means not shown) to thereby energize the solenoid winding 118. Closure of the relay 116 will connect the heater elements 80' across the supply leads 114, 115 to thereby apply more heat to the anvil roller and bearing block to raise their temperature above the originally set 130 degree level. In FIG. 12, this corresponding rise in the bearing block temperature is represented by the rising slope of curve A corresponding to the rise in curve B.

It will be noted that the invention thereby maintains a continuous 60 degree differential between curve A and curve B. The area between curve A and the upper boundary of the area C has been cross hatched and designated area D. Area D will be understood to represent the total amount of heat supplied by the heaters 80' to the machine to maintain the operating parts thereof at uniform clearances. It should be understood that while applicant has described the novel control system as maintaining a constant 60 degree differential temperature between the frame and bearing block thermocouples that this temperature is arbitrary. Furthermore, it may be readily altered to for instance 58 degrees or 62 degrees by the mere adjustment of control knob 134 should it be desired to make a minute change in the cutter to anvil roller clearance without resorting to a repositioning of the screws 52 and 60. While FIG. 12 illustrates the maintenance of a 60 degree differential should the frame temperature increase above the 70 degree level, it will be readily understood by those skilled in the art that applicant's system to equally effective to compensate for deviations of the frame temperature below 70 degrees should for some reason the room temperature drop.

I claim:
1. Apparatus for maintaining a substantially constant spaced peripheral relationship between a rotary cutter supported from one side of a generally rectangular machine frame and a co-operating hard surfaced anvil roller supported from the opposite side of the rectangular frame of a machine for cutting sheet material passing therebetween comprising, means for heating the supports of said rotary cutter and said anvil roller to a pre-established substantially constant temperature in excess of the normal operating temperature of said machine, means for adjusting the peripheral spacing between the co-operating cutter and anvil roller of the machine at the pre-established elevated temperature, means for sensing the heat rise in said machine adjacent said cutter and roller due to the operation thereof, means for sensing the temperature in the sides of the rectangular machine frame transverse to the axis of rotation of said cutter and anvil, and means for varying the amount of heat supplied by said heating means to maintain a constant predetermined temperature differential between said frame and cutter and anvil supporting means, so that the adjusted spaced relationship between the rotary cutter and anvil roller of said machine is maintained constant irrespective of its operating speed or conditions.

2. Apparatus according to claim 1, including bearings for rotationally supporting each end of said cutter and anvil roller, and wherein said adjusting means includes manual means to vary the relative positions of said bearings.

3. Apparatus according to claim 2 in which the bearings are provided with bearing boxes and said heating means includes a heating element supported by a bearing box.

4. Apparatus according to claim 2 in which said bearings are provided with bearing boxes and said heating means includes a heating element in each bearing box.

5. Apparatus according to claim 2 including means for adjusting the constant predetermined temperature difference for effecting small changes in the cutter to anvil clearance.

6. A machine for cutting sheet material comprising a pair of cooperating cutting and anvil rollers, bearing means supporting the ends of the rollers, frame means supporting the bearings including members parallel to the plane formed by the axes of the rollers and extending from one bearing axis to the other, means for sensing the temperature of the frame means in the region between the bearing axes, means for sensing the temperature of the bearing means, heating means for raising the temperature of the bearing means, and means responsive to the temperature sensing means related to the frame means and the temperature sensing means responsive to the bearing temperature controlling the bearing heating means to maintain a constant temperature difference between the bearings and the frame means.

References Cited by the Examiner

UNITED STATES PATENTS

| 1,978,894 | 10/1934 | Clark | 236—1 |
| 1,982,571 | 11/1934 | Clark | 83—171 |
| 2,236,366 | 3/1941 | Chapman | 83—344 |
| 2,271,637 | 2/1942 | Garrison | 83—171 |
| 2,381,955 | 8/1945 | Hoffman | 83—911 |
| 2,546,069 | 3/1951 | Hart | 83—346 |
| 2,621,736 | 12/1952 | Scruggs | 83—170 |
| 2,782,853 | 2/1957 | Heffelfinger | 83—170 |
| 3,064,563 | 11/1962 | Cook | 83—171 |

FOREIGN PATENTS 931,130    7/1963    Great Britain.

ANDREW R. JUHASZ, *Primary Examiner.*